United States Patent [19]

Hayashi

[11] Patent Number: 4,494,800
[45] Date of Patent: Jan. 22, 1985

[54] INTERLOCK BRAKING SYSTEM FOR MOTORCYCLES

[75] Inventor: Tsutomu Hayashi, Tokyo, Japan

[73] Assignee: Honda Giken Kogyo Kabushiki Kaisha, Tokyo, Japan

[21] Appl. No.: 377,408

[22] Filed: May 12, 1982

[30] Foreign Application Priority Data

May 13, 1981 [JP] Japan .................. 56-72071

[51] Int. Cl.³ .............................. B60T 8/02
[52] U.S. Cl. .................... 303/6 A; 188/344; 188/349; 303/6 C; 303/115; 303/116; 303/119
[58] Field of Search ............ 188/344, 106 P, 181 A, 188/181 R, 181 C, 24.11, 24.16, 349, 352; 303/6 A, 6 R, 6 C, 10–12, 116, 119, 117, 113, 91, 94, 96, 98, 102, 68, 71, 114, 115; 74/479, 481, 482

[56] References Cited

U.S. PATENT DOCUMENTS

| | | | |
|---|---|---|---|
| 3,286,958 | 11/1966 | Moran | 74/479 X |
| 3,288,232 | 11/1966 | Shepherd | 303/119 X |
| 3,503,654 | 3/1970 | Stamm | 303/96 |
| 3,507,117 | 4/1970 | Lauck | 74/481 X |
| 3,866,983 | 2/1975 | Kondo | 303/119 |
| 3,999,809 | 12/1976 | Inada et al. | 303/119 X |
| 4,176,886 | 12/1979 | Watanabe | 188/344 X |
| 4,239,294 | 12/1980 | Burgdorf | 188/344 X |
| 4,315,659 | 2/1982 | Hayashi et al. | 303/119 X |
| 4,346,944 | 8/1982 | Leiber | 303/119 |

Primary Examiner—Douglas C. Butler
Attorney, Agent, or Firm—Irving M. Weiner; Pamela S. Burt; Anthony L. Cupoli

[57] ABSTRACT

An interlock braking system for motorcycles comprising a brake pedal, a single master cylinder which generates a braking pressure according to an external force applied to the brake pedal, first and second brake mechanisms connected to the master cylinder for applying first and second braking forces according to the braking pressure to the front and rear wheels, respectively, and an anti-lock mechanism for changing the braking pressure according to rotational speeds of the front and rear wheels to prevent the wheels from becoming locked. In this manner, the interlock braking system effectively avoids the occurrence of a wheel-lock condition when braking the front and rear wheels of a motorcycle.

7 Claims, 10 Drawing Figures

INTERLOCK BRAKING SYSTEM FOR MOTORCYCLES

BACKGROUND OF THE INVENTION

1. Field of the Invention

The present invention relates generally to an interlock braking system for motorcycles. More particularly, the invention relates to an interlock braking system for motorcycles having front and rear wheel brake units connected to a single master cylinder which generates pressure when force is exerted on a brake pedal.

2. Description of Relevant Art

An interlock brake system for motorcycles having front and rear wheel brake units connected to a master cylinder which generates pressure when force is applied to a brake pedal has been generally known. In such a system, the generated pressure serves as a driving force to drive each of the brake units for braking both the front wheel and the rear wheel simultaneously, thereby simplifying the braking operation.

In such an interlock braking system, however, because braking of the front and rear wheels is effected by operation of the brake pedal as set forth above, one of the wheels is likely to become locked when driving in slippery areas, such as on an icy road surface. Thus, such wheel lock phenomenon has been a serious problem with respect to known systems.

The present invention effectively overcomes such problem attendant conventional interlock braking systems for motorcycles.

SUMMARY OF THE INVENTION

The present invention provides an interlock braking system for motorcycles comprising a brake pedal; a single master cylinder which generates a braking pressure in accordance with the magnitude of force externally exerted on the brake pedal; first and second braking mechanisms connected to the master cylinder for applying first and second braking forces to the front and rear wheels, respectively, in accordance with such braking pressure; and an anti-lock mechanism for changing such braking pressure in response to the rotational speed of each of the front and rear wheels to prevent locking of the wheels.

It is an object of the present invention to provide an interlock braking system which effectively avoids a wheel-lock condition when braking the front and rear wheels in a motorcycle wherein front and rear wheel brake units are connected to a single master cylinder which generates pressure when force is exerted on a brake pedal.

Another object of the present invention is to provide an interlock braking system in the aforesaid type of motorcycle whereby the possibility of the aforesaid wheel-lock condition occurring is minimized.

It is a further object of the present invention to provide an interlock braking system in the aforesaid type of motorcycle wherein the braking operation can be performed with relatively substantial freedom and flexibility.

The above and further objects, features and advantages of the present invention will become apparent from the following detailed description of preferred embodiments of the invention, when read in conjunction with the accompanying drawings.

DETAILED DESCRIPTION OF PREFERRED EMBODIMENTS

Figure 1:
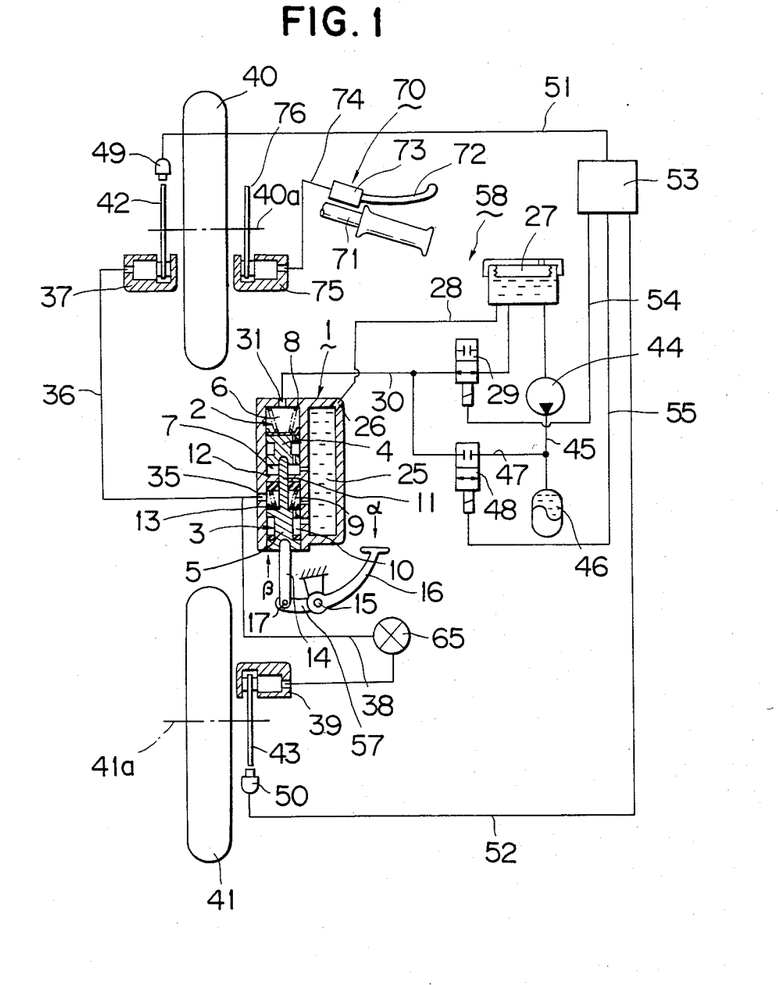
FIG. 1 is a block diagram showing the construction of an interlock braking system for motorcycles in accordance with a first embodiment of the present invention.
Figure 2:
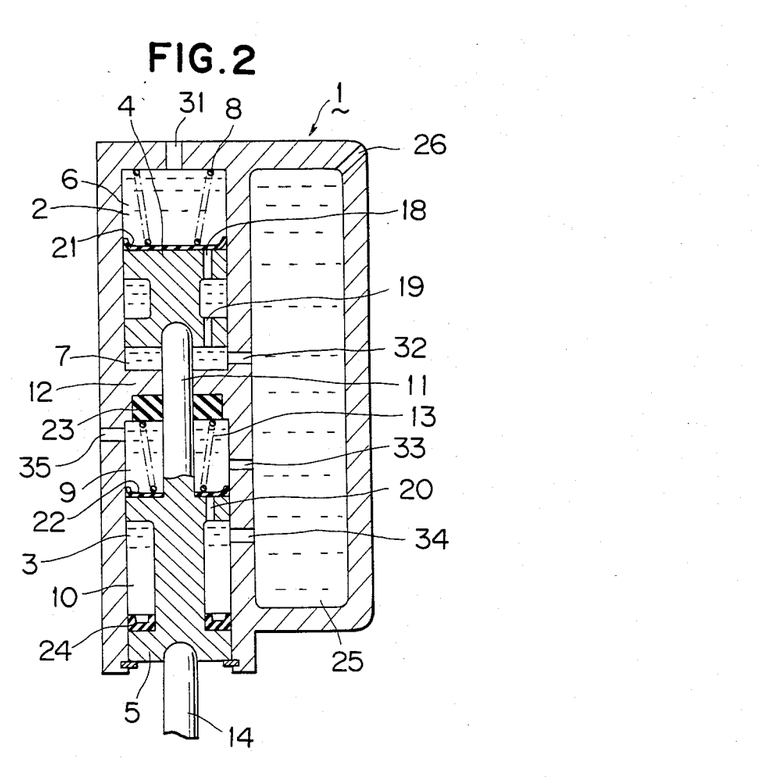
FIG. 2 is an enlarged sectional view of a master cylinder in the interlock braking system of FIG. 1.
Figure 3:
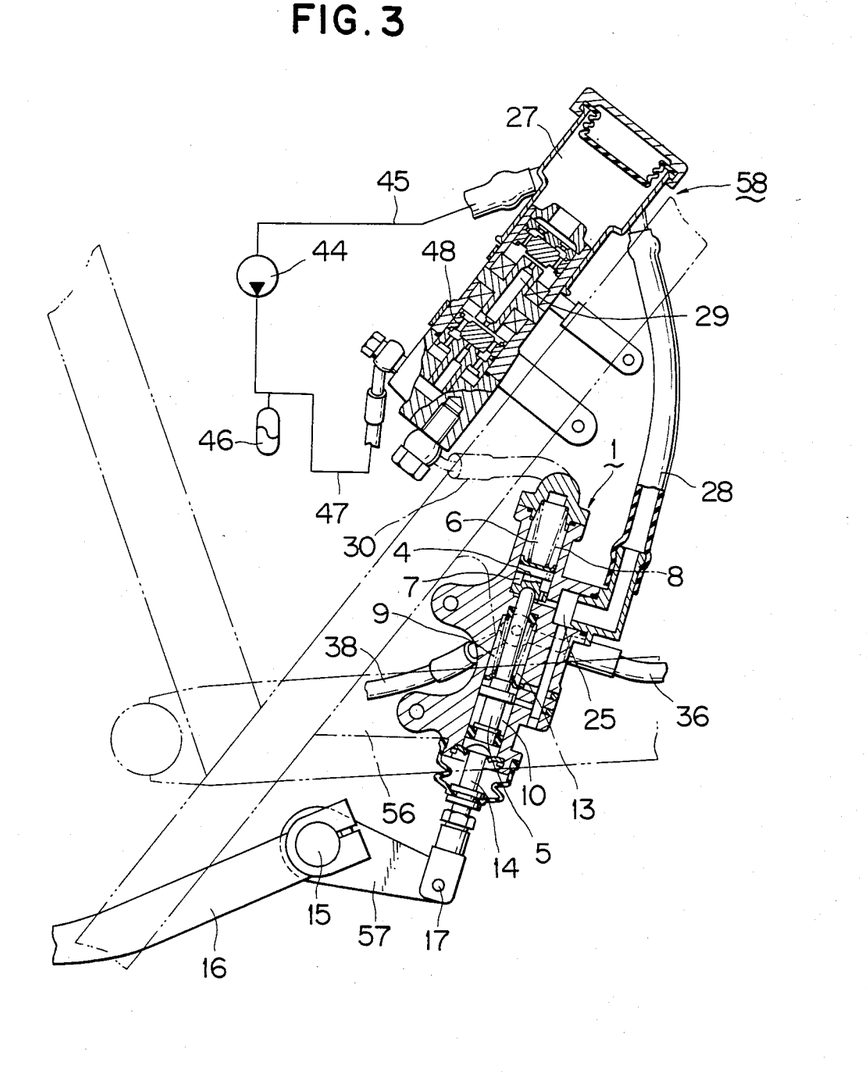
FIG. 3 is a partially cutaway side view of principal portions of the interlock braking system of FIG. 1 attached to a motorcycle.

With reference to FIGS. 1 through 3, there is shown a master cylinder 1 having an upper cylinder bore 2 and a lower cylinder bore 3 both formed in the interior of master cylinder 1, with a control piston 4 and an actuating piston 5 being slidably fitted in the cylinder bores 2 and 3, respectively. The control piston 4 partitions the cylinder bore 2 into an upper oil pressure control chamber 6 and a lower oil supply chamber 7, and is normally biased downwardly by a spring 8 which is disposed in a compressed manner within the chamber 6. The actuating piston 5 partitions the cylinder bore 3 into an upper oil pressure output chamber 9 and a lower oil supply chamber 10, and from the upper surface thereof is upwardly projected a piston rod 11 which extends through a partition wall 12 formed between the upper and lower bores 2 and 3 and is in abutting engagement with the lower surface of the control piston 4. The actuating piston 5 is subjected to a biasing force of a spring 13 disposed in a compressed manner within the oil supply chamber 10 and that of the spring 8 through the piston rod 11, whereby actuating piston 5 is normally urged to its lower limit position as shown. The lower surface of the actuating piston 5 is in abutting engagement with the upper end of a push rod 14, the lower end of push rod 14 being connected through a pin 17 to an arm member 57 which is integrally pivotable with a brake pedal 16. The brake pedal 16 is pivotably attached to the vehicle body frame through a pivot shaft 15.

In the piston 4 are longitudinally formed oil holes 18 and 19 for establishing communication between the oil supply chamber 7 and the oil pressure control chamber 6, while in the piston 5 is longitudinally formed an oil hole 20 for establishing communication between the oil supply chamber 10 and the oil pressure output chamber 9. The pistons 4 and 5 are provided on the respective upper surfaces thereof with elastic sealing cups 21 and 22 for opening and closing the oil holes 18 and 20, respectively. Seal members 23 and 24 are disposed on the lower side of the partition wall 12 and on a lower portion of the piston 5, respectively, to ensure that the portion between the cylinder rod 11 and the inner wall of the cylinder bore 3 is oil tight.

An oil tank 25 is formed in the interior of the master cylinder 1, and communicates through an oil hole 26 formed in the upper portion thereof with an oil path 28 which leads to a reservoir 27 as will be described in greater detail hereinbelow. An actuating oil is supplied from the reservoir 27 through the oil path 28 to the master cylinder 1 so as to fill same. The oil pressure control chamber 6 is also charged with the actuating oil from the reservoir 27 through a normally open valve 29, an oil path 30 and an oil hole 31. On the other hand, the oil supply chamber 7 normally communicates with the oil tank 25 through an oil path 32. While the piston 5 is not in operation, the oil pressure output chamber 9 and the oil supply chamber 10 are also in communication with the oil tank 25 through oil paths 33 and 34, respectively.

The oil pressure output chamber 9 of the master cylinder 1 is connected to a front wheel-side caliper 37 through an oil hole 35 formed in the side wall thereof and also through an oil path 36, and is also connected to a rear wheel-side caliper 39 through an oil path 38 branched from the oil path 36. To the respective axles 40a and 41a of a front wheel 40 and a rear wheel 41 are respectively fixed brake disks 42 and 43. The calipers 37 and 39 are mounted so as to surround the brake disks 42 and 43, respectively, and are each provided in a known manner with a hydraulic cylinder, a piston fitted in the hydraulic cylinder and a pair of brake pads.

The actuating oil in the reservoir 27 is held substantially at atmospheric pressure. As described hereinabove, the reservoir 27 communicates with the oil tank 25 of the master cylinder 1 through the oil path 28 and the oil hole 26 to supply the actuating oil to the oil tank 25, and also communicates with the oil pressure control chamber 6 of the master cylinder 1 through the normally open valve (solenoid valve) 29, the oil path 30 and the oil hole 31 to supply the actuating oil to the chamber 6. The reservoir 27 is further connected to an accumulator 46 through a hydraulic pump 44 and an oil path 45. From the oil path 45 is branched an oil path 47 at a portion of oil path 45 between the hydraulic pump 44 and the accumulator 46. The oil path 47 joins the oil path 30 through a normally closed valve (solenoid valve) 48.

Proximal the brake disks 42 and 43 of the front and rear wheels 40 and 41 are disposed revolution sensors 49 and 50 for detecting rotational speeds of the front and rear wheels 40 and 41, respectively. Output signals from the revolution sensors 49 and 50 are fed to a signal processing unit 53 through conductors 51 and 52, while control signals are provided from the signal processing unit 53 to the normally open valve 29 and also to the normally closed valve 48 through conductors 54 and 55, respectively, to energize or de-energize the solenoids of the valves 29 and 48 to thereby switch such valves from each other.

As shown in FIG. 3, the master cylinder 1 is fixed substantially perpendicularly to a substantially centrally positioned frame of the vehicle body through a bracket 56. On the other hand, the reservoir 27, the normally open valve 29 and the normally closed valve 48 are integrated as a single unit 58 mounted substantially parallel to the vehicle body frame.

In the construction as described hereinabove, if the brake pedal 16 is pushed pivotally downwardly (in the direction of arrow $\alpha$ in FIG. 1), the actuating piston 5 is subjected to a force transmitted from the push rod 14, so that it slides upwardly (in the direction of arrow $\beta$ in FIG. 1), thus causing the control piston 4 to slide in the same direction through the piston rod 11 against the biasing force of the springs 8 and 13. At this time, the actuating piston 5 closes the oil path 33 to thereby cut off communication between the oil pressure output chamber 9 and the oil tank 25, so that the actuating oil within the oil pressure output chamber 9 is compressed and increases in pressure. This increased pressure is transmitted through the oil hole 35 and oil paths 36, 38 to the front and rear wheels 37 and 39, thereby actuating the calipers 37 and 39 to generate braking forces. At this time, moreover, the oil supply chamber 10 of the master cylinder 1 slides while maintaining a constant capacity, and thus does not generate a resisting force to the oil pressure against the sliding motion of the actuating piston 5. In this case, the biasing force of the springs 8 and 13 and a reaction force against the actuating piston 5 caused by the increase in oil pressure of the oil pressure output chamber 9 are offset by the pushing force of the push rod 14, so that it is not necessary to take such forces into consideration.

On the other hand, the capacity of the oil supply chamber 7 increases with the sliding motion of the control piston 4, but by virtue of a negative pressure generated along with such sliding motion, the actuating oil in an amount corresponding to the capacity increase is absorbed and charged from the oil tank 25 into the chamber 7 through the oil path 32, while the capacity of the oil pressure control chamber 6 decreases by an amount corresponding to the capacity increase of the oil supply chamber 7. However, the actuating oil corresponding to the capacity in question is returned to the reservoir 27 through the oil hole 31, oil path 30 and normally open valve 29, so that the sliding motion of the control piston 4 does not cause a resisting force to the oil pressure.

Figure 4:
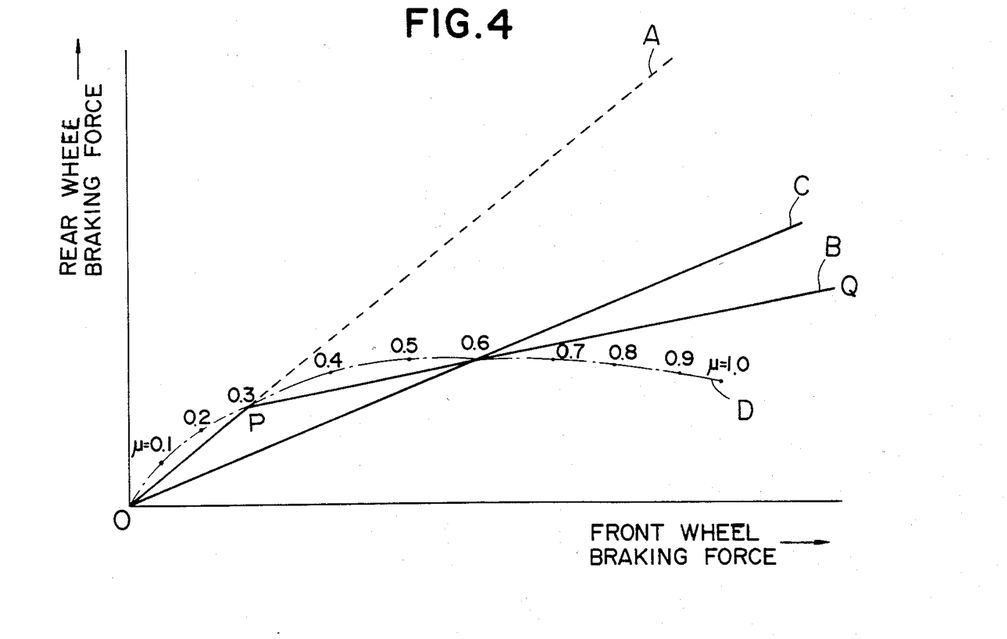
FIG. 4 is a graph showing braking force characteristics for front and rear wheels of interlock braking systems in motorcycles.

The braking forces generated against the front and rear wheels 40 and 41 are substantially equal if the cylinder bores of the calipers 37 and 39 are the same, so that both change in a linear relation such as indicated by the broken line A in FIG. 4.

In the event that either or both of the front and rear wheels 40 and 41 are likely to become locked due to an excessive braking force, i.e., when a deceleration value detected by the revolution sensors 49 and 50 and computed by the signal processing unit 53 exceeds a predetermined value, the signal processing unit 53 generates control signals to close the normally open valve 29 and open the normally closed valve 48. On the other hand, the accumulator 46 is normally filled with oil pressurized by the hydraulic pump 44, and thus upon such switching operation of the valves 29 and 48 this pressurized oil flows into the oil pressure control chamber 6 through the oil path 47, valve 48, oil path 30 and oil hole 31 and acts on the upper surface of the control piston 4, i.e., a downward reaction force is exerted thereon. This reaction force acts as a downward force on the actuating piston 5 through the piston rod 11. As a result, the oil pressure of the oil pressure output chamber 9 is decreased to mitigate the braking forces exerted on the front and rear wheels 40 and 41, to thereby avoid a wheel-lock condition.

The vehicle body as thus mitigated in braking force is accelerated by virtue of an inertia force acting thereon, i.e., the speed of rotation of the front and rear wheels is increased. When an acceleration value computed on the basis of rotational speeds detected by the revolution sensors 49 and 50 exceeds a predetermined value, the signal processing unit 53 again generates control signals to open the normally open valve 29 and close the normally closed valve 48. At this time, the control oil in the oil pressure control chamber 6 becomes equal to atmospheric pressure, so that the downward reaction force which has been exerted on the control piston 4 is removed, thus allowing the actuating piston 5 to move upwardly and increase the oil pressure of the oil pressure output chamber 9 for recovery of the braking force.

Thereafter, if a vehicular deceleration value again exceeds the predetermined value, the foregoing mitigation and recovery of the braking force is again performed and the foregoing anti-lock operation is repeated. In the range wherein vehicular deceleration values do not reach the aforesaid predetermined value, the foregoing mitigation of the braking force is not performed and corresponding forces are applied until the vehicle body comes to a stop.

When the vehicle body comes to a stop and the treading force applied to brake pedal 16 is removed, the pistons 4 and 5 are moved downwardly by the biasing force of the springs 8 and 13, so that the oil pressure in the oil pressure output chamber 9 decreases and returns to atmospheric pressure.

If vehicular deceleration values never exceed the predetermined value from the time the brake pedal 16 is depressed until the vehicle body comes to a stop, it is not necessary for the aforesaid anti-lock function to be performed, and thus the foregoing mitigation and recovery of the braking force is not performed.

Referring again to FIG. 1, a proportioning valve 65 is disposed in an intermediate position of the oil path 38 connecting between the master cylinder 1 and the rear wheel-side caliper 39. Assuming that upon depression of the brake pedal 16 a pressure is produced within the oil pressure output chamber 9 of the master cylinder 1 as previously noted, then in the range below the foregoing predetermined pressure at which the proportioning valve 65 starts operating, the pressures transmitted to the front and rear wheel-side calipers 37 and 39 are substantially equal and the braking forces acting on the front and rear wheels 40 and 41 are also substantially equal, and thus such braking forces change along line segment O - P in FIG. 4.

When the pressure generated in the oil pressure output chamber 9 exceeds the foregoing predetermined level at which the proportioning valve 65 is operated, the pressure acting on the rear wheel-side caliper 39 is decreased in a certain ratio with respect to the pressure generated in the oil pressure output chamber 9, i.e., the pressure acting on the front wheel-side caliper 37, and the rear wheel braking force is decreased in the same ratio with respect to the front wheel braking force, both changing along line segment P - Q in FIG. 4.

It will thus be understood that in accordance with the present embodiment of the invention it is possible to distribute the braking oil pressure in a ratio such as indicated by a bent line B (O-P-Q) in FIG. 4, so that by adjusting the aforesaid predetermined value and distribution ratio it is possible to attain performance closely resembling a curved line D shown in FIG. 4. If the distribution ratio of the braking oil pressure to the front and rear wheels 40 and 41 by the proportioning valve 65 is made approximately coincident with a ratio at which if a wheel-lock condition occurs both the front and rear wheels 40 and 41 are locked simultaneously, the probability of occurrence of wheel lock can be kept to a minimum. Even if the possibility of a wheel-lock condition should increase, the foregoing anti-lock function operates to effectively avoid the wheel-lock condition.

Moreover, because braking forces are proportional to the cylinder areas of the front and rear wheel-side calipers 37 and 39, instead of employing the proportioning valve 65, the calipers may be constructed so that their cylinder bore ratio coincides with the braking force distribution ratio to the front and rear wheels 40 and 41. In this case, the front and rear wheel braking forces change in a relation such as indicated by a straight line C in FIG. 4.

A front wheel brake device 70 as shown in FIG. 1 comprises a master cylinder 73 which generates pressure upon operation of a brake lever 72 attached to a handle 71 of the motorcycle, a caliper 75 connected to the master cylinder 73 through an oil path 74, and a brake disk 76 fixed to the axle 40a of the front wheel 40. If a large braking force is required in the righthand area from point (a) in FIG. 4, the front wheel brake device 70 can be operated independently, and consequently a substantial amount of freedom and flexibility is imparted to the braking operation. Further, the front wheel brake device 70 can also be utilized when pushing the motorcycle by hand or stopping it on an upward slope.

Referring generally to FIG. 4, front and rear wheel braking forces are plotted along the axis of abscissa and that of ordinate, respectively, shown in the range of approximately 0.1 g to approximately 1.0 g (g being a gravitational acceleration) as a total of front and rear wheel decelerations, in which D is an ideal braking force distribution curve, i.e., an ideal front and rear wheel braking force distribution curve at a friction coefficient $\mu$ ranging from 0.1 to 1.0.

The dashed straight line A shows the case where the braking force distributed to the front wheel and to the rear wheel is almost equal, in which the rear wheel braking is likely to become excessive. On the other hand, according to the bent line B showing the relation of braking force distribution ratios in the case of adopting the proportioning valve 65 as the braking force distribution mechanism or a straight line C showing the relation of braking force distribution ratios in the case where instead of employing the valve 65 the size of the rear wheel-side brake unit is set to be smaller than that of the front wheel-side brake unit, the front and rear wheel braking forces scarcely involve excess or deficiency until point (a) is reached, which is an intersecting point with the ideal curve D, i.e., in the lefthand area from point (a). Thus, an ideal distribution ratio can substantially be maintained.

Figure 5:
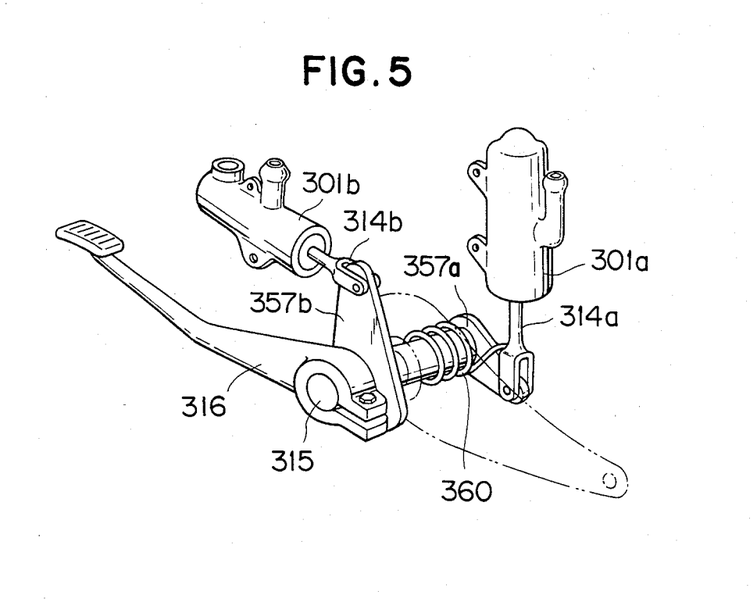
FIG. 5 is a schematic perspective view showing the arrangement of a master cylinder and an actuator in an interlock braking system for motorcycles according to a second embodiment of the present invention.

With reference now to FIGS. 5 and 8 through 10, there is shown a second embodiment of the present invention. A brake pedal 316 is pivotably supported by an arm shaft 315, and on the arm shaft 315 are mounted two arms 357a and 357b so that the arms 357a and 357b are approximately 90° out of phase with each other as shown in FIG. 5, and pivot integrally with the shaft 315. Between the arm 357a and the shaft 315 is stretched a return spring 360. To an end portion of the arm 357a is pivoted the lower end of a push rod 314a which extends downwardly from an upright master cylinder 301a. To an end portion of the other arm 357b is pivoted an end portion of a push rod 314b extending from an actuator 301b which is mounted nearly horizontally.

In this embodiment, the master cylinder 301a functions as a pressure generating mechanism which generates pressure when treading force is applied to the brake pedal 316, and as a mechanism for controlling the pressure generated in the master cylinder 301a there is separately provided the actuator 301b which is of substantially the same shape as the master cylinder 301a. Also provided is a proportioning valve 365 and a front wheel brake device 370, both of which constructions are similar to those of the first embodiment.

Figure 9:
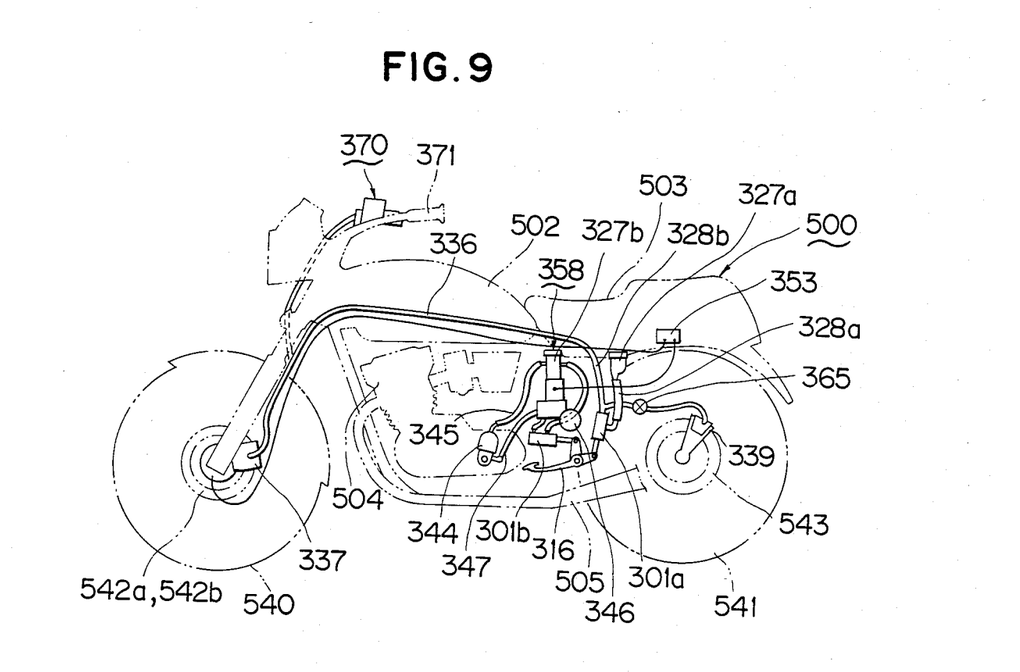
FIG. 9 is a schematic side view of the motorcycle shown in FIG. 8.
Figure 10:
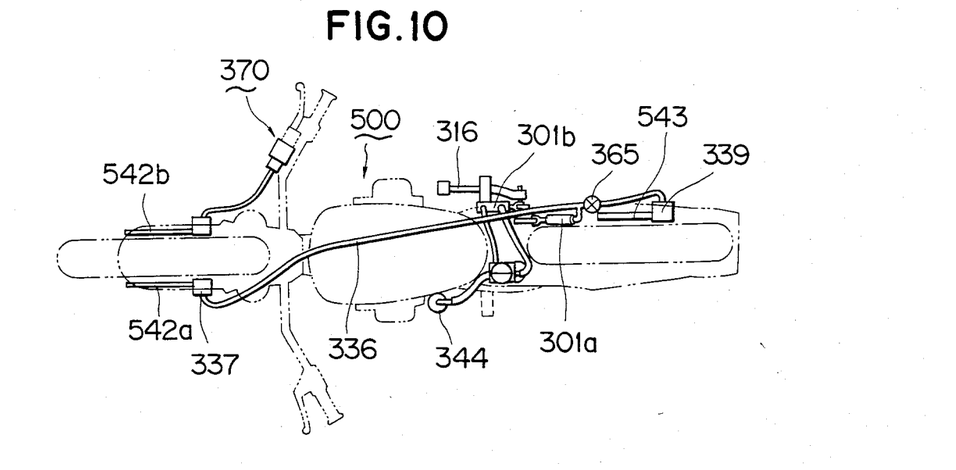
FIG. 10 is a schematic plan view of the motorcycle shown in FIG. 8.

In FIGS. 9 and 10 there is shown a motorcycle 500 having a front wheel 540, a rear wheel 541, front wheel brake disks 542a and 542b, a rear wheel brake disk 543, a handlebar 371, a fuel tank 502, a seat 503, an engine 504 and a muffler 505, with a signal processing unit 353 being attached to motorcycle 500.

The master cylinder 301a and the actuator 301b are fixed to the vehicle body frame. As clearly shown in FIG. 8, slidably disposed within the master cylinder 301a is an actuating piston 305 which is normally urged downwardly by the biasing force of a spring 313 disposed within an oil pressure output chamber 309. The piston 305 is adapted to slide through the push rod 314a, the upper end of which abuts the lower surface of the piston 305, and further through the arm 357a and arm shaft 315 when treading force is applied to the pedal 316. The oil pressure output chamber 309 and an oil supply chamber 310 both formed within the master cylinder 301a are normally filled with an actuating oil fed from a reservoir 327a mounted separately from the master cylinder 301a through a pipe 328a and oil paths 333 and 334. The oil pressure output chamber 309 is connected through an oil path 336 to front and rear wheel-side calipers 337 and 339.

Figure 8:
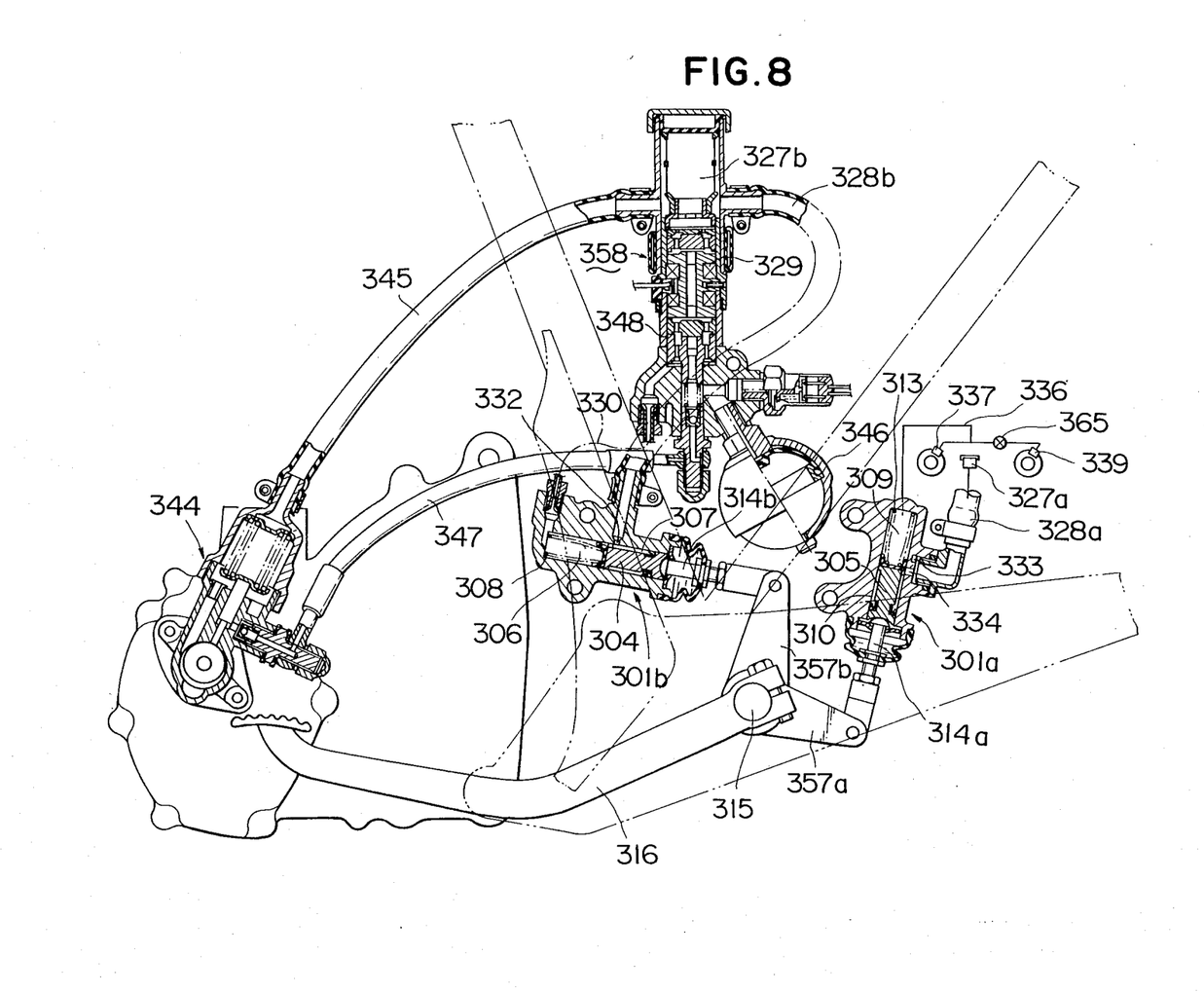
FIG. 8 is a partially cutaway side view of principal portions of the interlock braking system of FIG. 5 attached to a motorcycle.

Slidably disposed within the actuator 301b is a control piston 304 which normally is held in the rightmost position in FIG. 8 by the biasing force of a spring 308 disposed within the oil pressure control chamber 306. As is the case with the master cylinder 301a, the control piston 304 is adapted to slide through the push rod 314b which is in abutting engagement at its tip end portion with the right end face of the piston 304, and further through the arm 357b and arm shaft 315 when treading force is applied to the brake pedal 316.

Above the actuator 301b is separately disposed a unit 358 comprising an integrated combination of a reservoir 327b, a normally open valve 329 and a normally closed valve 348. The reservoir 327b communicates with an oil supply chamber 307 formed within the actuator 301b through a pipe 328b and an oil path 332, and supplies an actuating oil to the oil supply chamber 307. When the actuator 301b is not in operation, the reservoir 327b communicates through the normally open valve 329 and a pipe 330 with an oil pressure control chamber 306 formed within the actuator 301b. Further, when the actuator 301b is in operation, i.e., when the normally open valve 329 is closed and the normally closed valve 348 is open, the reservoir 327b communicates with the oil pressure control chamber 306 in the actuator 301b through pipe 345, hydraulic pump 344, pipe 347, accumulator 346, normally closed valve 348 and pipe 330. The hydraulic pump 344, driven by part of the vehicular engine power, is for pressurizing the actuating oil, and the resulting pressurized oil is normally stored in the accumulator 346. The reservoir 327b may be common to the other reservoir 327a if desired.

Operation of the second embodiment of the invention, wherein the master cylinder 301a as a source of oil pressure control and the actuator 301b for controlling the pressure generated in the master cylinder 301a are mounted separately, will be described hereinbelow.

When the brake pedal 316 is depressed to thereby allow the arm shaft 315 and the arm 357a, both adapted to pivot integrally therewith, to move pivotally in a counter-clockwise direction in FIG. 8, the piston 305 in the master cylinder 301a is pushed by the push rod 314a and moves upwardly against the spring 309, thus increasing the pressure within the oil pressure output chamber 309. This increased pressure in the chamber 309 is transmitted to the front and rear wheel-side calipers 337 and 339 to actuate the calipers to generate required braking forces.

On the other hand, the control piston 304 within the actuator 301b also moves to the left against the spring 308, but because at this time the oil pressure control chamber 306 is in communication with the reservoir 327b held at a pressure equal to atmospheric pressure by the action of the normally open valve 329, the actuating oil in the chamber 306 is returned to the reservoir 327b by the pumping action of the control piston 304.

When the motorcycle undergoes an excessive braking force and consequently a wheel-lock condition is very likely to occur, the normally open valve 329 is closed and the normally closed valve 348 is opened, so that the pressurized oil stored in the accumulator 346 flows into the oil pressure control chamber 306 of the actuator 301b and acts on the end face of the control piston 304, thus causing the latter to move to the right in FIG. 8. Upon such rightward movement of the piston 304, the arm 357b pivots in a clockwise direction in FIG. 8 through the rod 314b, thus causing the arm 357a adapted to pivot integrally with the arm shaft 315 to move pivotally in a clockwise direction through the arm shaft 315, so that the push rod 314a undergoes a downward reaction force. Therefore, an upward force acting on the actuating piston 305 is diminished by an amount corresponding to such reaction force and the pressure within the oil pressure output chamber 309 also decreases in proportion thereto, whereby the front and rear wheel braking forces are mitigated to effectively avoid a wheel-lock condition.

Thereafter, the motorcycle is again accelerated by virtue of an inertia force acting on the vehicle body, and when this acceleration exceeds the predetermined value, the valves 329 and 348 are switched from each other to again apply the brakes. Then, from the time when the possibility of wheel lock in braking is eliminated and until the motorcycle comes to a stop, braking forces are applied continuously without being mitigated.

In the interlock braking system according to the second embodiment described hereinabove, the brake system and the control system serving as an anti-lock mechanism are provided separately. Therefore, the anti-lock mechanism can be easily attached to conventional interlock braking systems whenever required and the type of oil to be used in the control system can be selected independently of the oil used in the brake system with the result that maintenance is facilitated. Moreover, as can be seen from FIG. 8, the entire system is rendered highly compact, and such reduction in size is particularly advantageous in motorcycles wherein the mounting space for such equipment is a limiting factor. Further, because the shape of the actuator 301b is substantially the same as that of the master cylinder 301a, the machining method for the actuator 301b is substantially the same as that for the master cylinder 301a, so that the number of machining steps, as well as the production costs, can be reduced.

Figure 6:
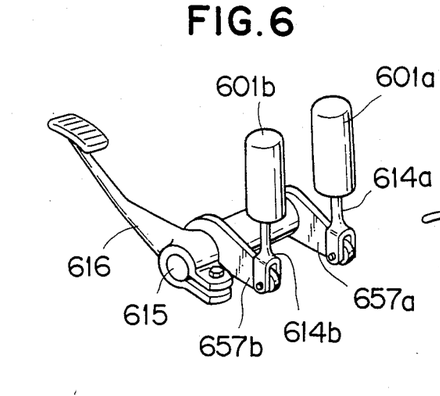
FIG. 6 is a view similar to FIG. 5 showing an interlock braking system for motorcycles according to a third embodiment of the present invention.
Figure 7:
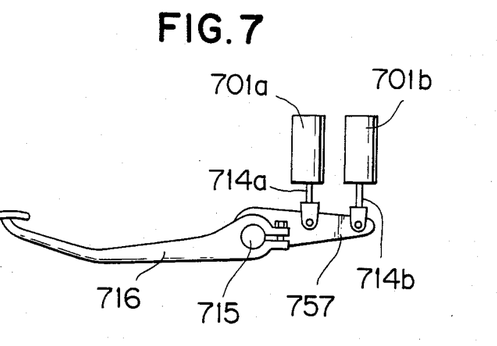
FIG. 7 is a view similar to FIG. 5 showing an interlock braking system for motorcycles according to a fourth embodiment of the present invention.

With reference now to FIGS. 6 and 7, there are shown exemplary arrangements of a master cylinder and an actuator with respect to an arm shaft in interlock braking systems according to third and fourth embodiments of the present invention.

In FIG. 6, there is shown an arm shaft 615 to which are fixed two arms 657a and 657b extending in substantially the same direction, and disposed upright above these two arms is a master cylinder 601a and an actuator 601b. Rods 614a and 614b extend downwardly from the master cylinder 601a and actuator 601b and are pivoted to the arms 657a and 657b, respectively.

In FIG. 7, there is shown an arm shaft 715 to which is fixed a single arm 757, and disposed upright above single arm 757 is a master cylinder 701a and an actuator 701b. Rods 714a and 714b extend downwardly from the master cylinder 701a and actuator 701b, respectively, and are pivoted to the arm 757 at different distances from the arm.

The same effect as attained by the second embodiment of the invention described hereinabove with reference to FIG. 5 is also attained in accordance with the third and fourth embodiments shown in FIGS. 6 and 7.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. An interlock braking system for motorcycles, comprising:
   a brake pedal;
   a single master cylinder operably connected with said brake pedal;
   first and second brake means connected to said master cylinder for applying first and second braking forces to a front wheel and a rear wheel, respectively, according to braking pressures corresponding to an external force applied to said brake pedal;
   a pressure circuit connecting said master cylinder with said first and second brake means;
   a braking force distribution mechanism for changing said first and second braking forces of said first and second brake means at a predetermined ratio set therebetween;
   anti-lock means, operably connected with said first and second brake means, for changing said first and second braking forces of said first and second brake means according to the rotational speeds of said front and rear wheels to prevent said wheels from becoming locked;
   said master cylinder including a first piston member operably connected to said brake pedal, a first cylinder accommodating said first piston member therein, a second piston member operably connected to said brake pedal, a second cylinder accommodating said second piston member therein, a first oil chamber defined by said first piston member and said first cylinder for generating said braking pressures, and a second iol chamber defined by said second piston member and said second cylinder;
   said anti-lock means being provided with a control mechanism for changing said braking forces according to said rotational speeds of said front and rear wheels;
   said control mechanism including a first relatively low pressure source, a second relatively high pressure source, a normally open valve disposed between said first oil chamber and said first pressure source, and a normally closed valve disposed between said second oil chamber and said second pressure source;
   said control mechanism closing and opening said normally open valve and said normally closed valve according to said rotational speeds of said front and rear wheels, whereby locking of said wheels is prevented; and
   said braking force distribution mechanism being set at a predetermined proportion in which said first braking force applied to said front wheel is greater than said second braking force applied to said rear wheel.

2. A braking system according to claim 1, wherein:
   said control mechanism includes means for decreasing said braking pressure when a deceleration value in the rotational speed of said front wheel exceeds a predetermined value, and means for proportioning said braking forces substantialy to said external force when said deceleration value is less than said predetermined value.

3. A braking system according to claim 1, wherein:
   said braking force distribution mechanism comprises a proportioning valve disposed between said master cylinder and said second brake means, said proportioning valve being adapted to decrease said braking pressure at said predetermined ratio.

4. A braking system according to claim 1, wherein:
   said braking force distribution mechanism comprises first and second power cylinders which generate said first and second braking forces of said first and second brake means, the size ratio of cylinder bores of said first and second power cylinders being substantially the same as said predetermined ratio.

5. A braking system according to claim 1, wherein:
   said anti-lock means comprises an auxiliary external force applying mechanism which applies an auxiliary external force to said brake pedal for changing said braking pressure.

6. A braking system according to claim 5, wherein said auxiliary external force applying mechanism comprises an arm member which is integrally pivotable with said brake pedal, and an actuator connected to said arm member.

7. A braking system according to claim 1, wherein:
   said front wheel is provided with a third brake means operably connected with a hand brake lever for applying a third braking force to said front wheel according to an external force exerted on said brake lever.

* * * * *